US011117805B2

(12) United States Patent
Botte

(10) Patent No.: US 11,117,805 B2
(45) Date of Patent: Sep. 14, 2021

(54) ROLL-TO-ROLL GRAPHENE PRODUCTION, TRANSFER OF GRAPHENE, AND SUBSTRATE RECOVERY

(71) Applicant: Ohio University, Athens, OH (US)

(72) Inventor: Gerardine G. Botte, Athens, OH (US)

(73) Assignee: Ohio University, Athens, OH (US)

( * ) Notice: Subject to any disclaimer, the term of this patent is extended or adjusted under 35 U.S.C. 154(b) by 107 days.

(21) Appl. No.: 16/076,833

(22) PCT Filed: Feb. 16, 2017

(86) PCT No.: PCT/US2017/018117
§ 371 (c)(1),
(2) Date: Aug. 9, 2018

(87) PCT Pub. No.: WO2017/143027
PCT Pub. Date: Aug. 24, 2017

(65) Prior Publication Data
US 2019/0047867 A1   Feb. 14, 2019

Related U.S. Application Data

(60) Provisional application No. 62/295,647, filed on Feb. 16, 2016.

(51) Int. Cl.
*C01B 32/186* (2017.01)
*C25D 1/20* (2006.01)
(Continued)

(52) U.S. Cl.
CPC ............. *C01B 32/186* (2017.08); *B01J 23/72* (2013.01); *B01J 35/02* (2013.01); *B01J 37/348* (2013.01);
(Continued)

(58) Field of Classification Search
CPC .......... B01J 23/72; B01J 35/02; B01J 37/348; C25F 5/00; C25F 7/00; C25D 1/20;
(Continued)

(56) References Cited

U.S. PATENT DOCUMENTS

| 8,227,685 B2 * | 7/2012 | Choi | ...................... H05B 33/28 136/252 |
| 2009/0308520 A1 * | 12/2009 | Shin | ........................ B82Y 30/00 156/60 |

(Continued)

FOREIGN PATENT DOCUMENTS

| CN | 106673655 A * | 5/2017 | ............. C04B 35/52 |
| EP | 2690198 A2 * | 1/2014 | ............... C25B 9/00 |

(Continued)

OTHER PUBLICATIONS

English Translation of KR101320407.*
(Continued)

*Primary Examiner* — Sonya M Sengupta
(74) *Attorney, Agent, or Firm* — Wood Herron & Evans LLP

(57) ABSTRACT

A method of producing a graphene film (22) includes forming a catalyst film (20) on a support (18); forming a graphene film (22) on the catalyst film (20); and electrolytically removing the catalyst film (20) from the support (18). The method may include transferring the graphene film (22) to a substrate (29). A supported graphene film includes a conductive support (18); a catalyst film (20) formed on the conductive support (18) having a thickness in a range of 1 nm to 10 μm, and a graphene film (22) formed on the catalyst film (20).

10 Claims, 1 Drawing Sheet

(51) Int. Cl.
    *C25F 5/00*     (2006.01)
    *C25D 3/38*     (2006.01)
    *C25D 7/06*     (2006.01)
    *C25F 7/00*     (2006.01)
    *C01B 32/194*     (2017.01)
    *B01J 23/72*     (2006.01)
    *B01J 35/02*     (2006.01)
    *B01J 37/34*     (2006.01)
    *C25D 5/04*     (2006.01)
    *B82Y 30/00*     (2011.01)
    *B82Y 40/00*     (2011.01)

(52) U.S. Cl.
    CPC .............. *C01B 32/194* (2017.08); *C25D 1/20* (2013.01); *C25D 3/38* (2013.01); *C25D 5/04* (2013.01); *C25D 7/0614* (2013.01); *C25F 5/00* (2013.01); *C25F 7/00* (2013.01); *B82Y 30/00* (2013.01); *B82Y 40/00* (2013.01)

(58) Field of Classification Search
    CPC .......... C25D 3/38; C25D 5/04; C25D 7/0614; C01B 32/186; C01B 32/194; B82Y 30/00; B82Y 40/00
    See application file for complete search history.

(56) References Cited

U.S. PATENT DOCUMENTS

| | | | |
|---|---|---|---|
| 2011/0195207 A1* | 8/2011 | Hong | C23C 16/463 428/34.1 |
| 2011/0300338 A1* | 12/2011 | Shin | C01B 32/184 428/156 |
| 2013/0059155 A1* | 3/2013 | Choi | C23C 16/26 428/408 |
| 2013/0264009 A1* | 10/2013 | Kimura | B82Y 40/00 156/230 |
| 2014/0030857 A1* | 1/2014 | Lee | C01B 32/186 438/158 |
| 2014/0290565 A1* | 10/2014 | Kim | B01J 23/50 117/94 |
| 2014/0313636 A1* | 10/2014 | Tour | H01G 11/36 361/502 |
| 2015/0068684 A1* | 3/2015 | Hong | B32B 37/0053 156/760 |
| 2015/0368112 A1* | 12/2015 | Na | G03F 7/20 428/408 |

FOREIGN PATENT DOCUMENTS

| | | | | |
|---|---|---|---|---|
| KR | 101320407 B1 | * | 10/2013 | |
| WO | WO-2011046415 A2 | * | 4/2011 | ......... B32B 37/0053 |
| WO | WO-2012093443 A1 | * | 7/2012 | ............. B82Y 40/00 |
| WO | WO-2013119295 A1 | * | 8/2013 | ............ C01B 32/158 |
| WO | WO-2014126298 A1 | * | 8/2014 | ............ C01B 32/186 |

OTHER PUBLICATIONS

Translation of CN 104451591.*
Translation of CN 106673655.*
Translation of EP2690198.*
Translation of KR101320407.*
Search by STIC 1700 (Year: 2021).*
International Search Report in International Patent Application No. PCT/US2017/018117, dated Apr. 28, 2017, 1 pg.
Written Opinion in International Patent Application No. PCT/US2017/018117, dated Apr. 28, 2017, 4 pgs.

\* cited by examiner

ROLL-TO-ROLL GRAPHENE PRODUCTION, TRANSFER OF GRAPHENE, AND SUBSTRATE RECOVERY

TECHNICAL FIELD

The present invention relates generally to graphene films and methods of making same and, more specifically, to methods of making a graphene film on a catalyst-electroplated support, transfer of the graphene film, and the recovery of the support.

BACKGROUND

Graphene, a two-dimensional monolayer of $sp^2$-hybridized carbon atoms arranged in a honeycomb network, exhibits excellent mechanical, thermal, electrical, and optical properties, large specific surface area, and chemical stability. These superb properties offer graphene many potential applications ranging from nanoelectronics, composite materials, sensors to electrochemical electrodes in lithium ion batteries, solar cells, transparent electrodes, energy cells, barriers, heat radiation, conductive inks, capacitors, ultracapacitors, etc.

Industrially relevant scales for graphene production will only be possible using either liquid exfoliation or chemical vapor deposition (CVD) yielding graphene platelets and graphene films respectively. In other words, CVD produced graphene (CVDG) would yield large-area films in a roll to roll configuration enabling markets for specialty display (due to transparency), water remediation (due to low permeability), and specialty composites (due to electronic conductivity). CVDG requires the use of a gaseous hydrocarbon and a substrate (e.g., copper foil), with later removal of the substrate using metal dissolution and polymer support for effective transfer/incorporation of graphene into the point-of-use device/system. This method needs expensive polymers, such as PMMA, for coating and also is a time consuming process due to the slow chemical etching process. Both polymer and organic solvents sharply increase the cost and limit the scalable applications of CVD graphene. Unfortunately, CVDG manufacturing is impeded by process costs associated with feedstock, substrate loss, and graphene transfer leading to a hindrance in process scale-up and market integration.

According to market analyses, graphene will be competitive if a cost of $10 per $m^2$ on substrate is achieved; however, current graphene production costs have are above $20 per $m^2$. A significant component of the cost is the substrate required for the synthesis, e.g., copper foil, and the polymer employed to transfer the graphene to the required support.

Considering these facts, a need exists for new methods of manufacturing graphene that address the above issues.

SUMMARY

In an embodiment, the present invention provides a method of producing a graphene film. The method includes forming a catalyst film on a support; forming a graphene film on the catalyst film; and electrolytically removing the catalyst film from the support with simultaneous transferring of the graphene to the desired substrate and/or device.

In another embodiment, the present invention provides a supported graphene film. The supported graphene film includes a conductive support; a catalyst layer formed on the conductive support having a thickness of 1 nm or greater, generally 50 nm or greater, and 25 µm or less, generally 10 µm or less; and a graphene layer formed on the catalyst layer.

The objects and advantages of present will be appreciated in light of the following detailed descriptions and drawings in which:

DETAILED DESCRIPTION

Embodiments of the present invention are directed to using roll-to-roll electroplating to form a catalyst-coated support on which graphene films may be formed via CVD. In an embodiment, a catalyst film is deposited on a support with controlled thickness and morphology that allows the synthesis of graphene at different temperatures, pressures, and the implementation of different hydrocarbon gases. In an embodiment, the catalyst film may be deposited on a support via electroplating.

The catalyst film includes active materials for the synthesis of graphene. The catalyst film may be made of, without limitation, copper, nickel, iron, ruthenium, iridium, rhodium, cobalt, chromium, rhenium, palladium, gold, and combinations thereof. The termination criteria for the electrodeposition is based on the charge pass, which can be calculated to enable a control thickness of the catalyst film using theoretical equations such as Faraday's law and the faradaic efficiency. The thickness of the catalyst film depends on the synthesis conditions for graphene. For example, the thickness of the catalyst film may vary based on the temperature of the graphene synthesis, the pressure conditions for the synthesis, the support, and the adherence of the film to the support. Graphene growth conditions have been reported in temperature ranges of about 300° C. up to about 1060° C. The thickness of the film may be at least 1 nm, at least 50 nm, at least 100 nm, at least 500 nm, at least 1 µm, at least 8 µm, or at least 10 µm, up to 25 µm, and may range from 500 nm up to 10 µm, from 1 µm up to 10 µm, or from 1 µm up to 25 µm (the ranges including the endpoints).

The support is flexible, electrically conductive, corrosion resistant, and able to withstand CVD conditions. The support may be made of, without limitation, carbon, titanium, stainless steel, steel, aluminum, brass, bronze, cast iron, gold, nickel, silver, tungsten, wrought iron, etc., and suitable conductive polymers that can withstand the CVD environment. The thickness of the support should be thicker than the thickness of the film to stand manipulation and rolling through the conveyer. For example, the thickness of the support may be at least 10 µm. The support may be pretreated to, for example, remove contaminants from the surface. For example, pretreatment may remove oxides from the surface so that the catalyst can adhere to the surface.

Figure 1:
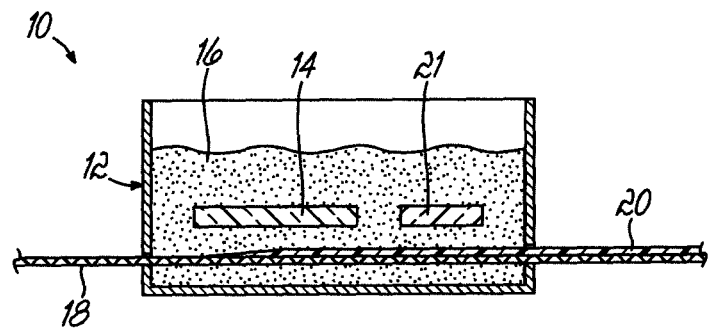
FIG. 1 is a schematic of the deposition of a catalyst film on a support according to an embodiment of the present invention.

With reference to FIG. 1, in an embodiment, an electrodeposition unit 10 includes an electrochemical cell 12 that includes an anode 14 and an electrolyte 16. The anode 14 is electrically conductive and stable in the electrolyte 16. The surface area should be at least the same as the cathode. The anode 14 may be made of, without limitation, platinum, plated platinum, stainless steel, titanium, carbon steel, carbon, etc. The support 18 acts as the cathode during the electroplating. The electrolyte 16 includes a salt of the metal catalyst to be deposited on the support 18. In an embodiment, the electrolyte 16 includes $CuSO_4$ and $H_2SO_4$. As a potential is applied to the electrochemical cell 12, the catalyst is deposited on the support 18 and forms the catalyst film 20. The support 18 may be continuously transported through the electrochemical cell 12. The thickness and morphology of the catalyst film 20 may be controlled by controlling the electroplating conditions. For example, maintaining different charges may result in catalyst films 20 of different thicknesses. In an embodiment, the electrochemical cell 12 may contain an optional reference electrode 21 (e.g., commercial and/or pseudo reference electrodes). In such an embodiment, the potential is applied between the support 18 (i.e., the cathode) and the reference electrode 21. The reference electrode 21 may include commercial reference electrodes chosen based on the chemistry of the media, which include, without limitation, Hg/HgO, Ag/AgCl, dynamic hydrogen, copper-copper sulfate electrode, reversible hydrogen electrodes. Examples of materials for pseudo reference electrodes include gold, platinum, plated platinum, nickel, titanium carbon steel, silver, carbon, etc.

Figure 2:
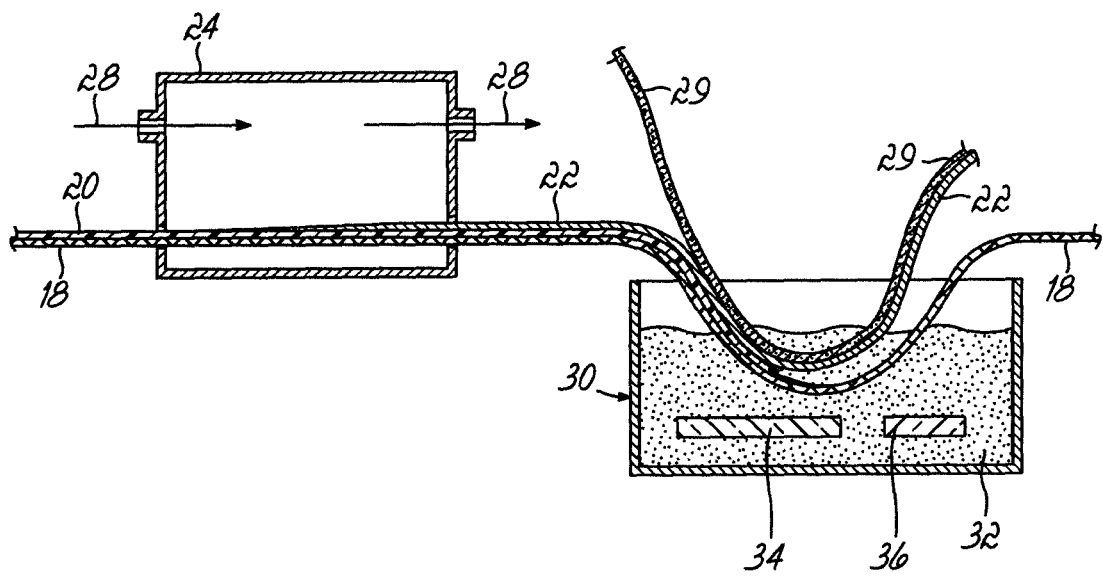
FIG. 2 is a schematic of the deposition of a graphene film on the catalyst-coated support of FIG. 1 and the separation of the graphene film from the support according to an embodiment of the present invention.

Referring to FIG. 2, in an embodiment, a graphene film 22 may be deposited on the catalyst-coated support 18 via chemical vapor deposition (CVD). The support 18 with the catalyst film 20 may be transported through a CVD chamber 24. In the CVD chamber 24, the coated catalyst-coated support 18 is exposed to a graphene synthesis gas at a temperature and pressure sufficient to form a graphene film 22. The graphene synthesis gas includes at least one carbon source. Additionally, a hydrogen containing gas (e.g., $H_2$) may be introduced to the CVD chamber 24 along with the graphene synthesis gas. The formation of the graphene film 22 may be performed by a chemical vapor deposition method typically employed in the art. For example, the graphene synthesis gas may flow through the CVD chamber 24 as shown by arrows 28. The synthesis temperature may be determined based at least in part on the thickness of the catalyst film 20. For example, the synthesis temperature may range from 300° C. to 1100° C. The synthesis may be conducted in a vacuum. For example, the pressure may be 40 mTorr. It should be recognized that the synthesis conditions (e.g., flow rate, synthesis time) may vary based on the size of the graphene oven, the vacuum/pressure, and the synthesis gas used.

With further reference to FIG. 2, once the graphene film 22 has been deposited on the catalyst-coated support 18, the graphene film 22 may be separated from the support 18 and transferred to a desired material or device 29. For example, the support 18 may be transported from the CVD chamber 24 to an electrolysis unit 30. The electrolysis unit 30 includes a solution 32 in which the catalyst film 20 is electrolyzed, a cathode 34, and optionally a reference electrode 36. The support 18 acts as an anode. The material 29 and the support 18 are transported through the electrolysis unit 30 with the graphene film 22 in contact with the material 29. Electrolysis of the catalyst film 20 separates the graphene film 22 from the conductive support 18 and transfers the graphene film 22 to the desired material 29. It should be recognized that the electrolysis conditions may vary. For example, the applied voltage may range from 0.1 to 4 V. Further, the applied potential may be higher than the oxidation potential of the conductive catalyst (e.g., higher than the oxidation potential of copper for a copper-coated support). The temperature may range from ambient temperature to 80° C. The conductive support 18 may be recovered. The support 18 can then be reused again in the method and apparatus shown in FIG. 1. Further, the electrolyzed catalyst may be recovered and reused.

Embodiments of the present invention reduce the amount of copper (or other catalyst) used to form graphene films via CVD. Because of the reduced amount of catalyst used, the energy and time required to electrolyze the catalyst is reduced. Accordingly, the costs of producing graphene sheets via CVD are reduced. Further, embodiments of the present invention offer the capability to develop graphene manufacturing facilities and/or to transfer graphene to the desired device/material at the point of use.

In order to facilitate a more complete understanding of the embodiments of the invention, the following non-limiting examples are provided.

Example 1

Depositing Catalyst Film on Support.

Copper films having different thicknesses of 500 nm, 1 µm, 10 µm were deposited on titanium foil supports. The plating area was 2 cm×1.3 cm for each of the three samples. The titanium foil was pretreated by immersing in a mixture of 100 ml 18 wt % HCl and 100 ml 48 wt % $H_2SO_4$ solution for 30 min. The plating solution included 1 M $CuSO_4$ in 1 M $H_2SO_4$. A three-electrode electrochemical cell was utilized with the titanium foil as the working electrode, Ag/AgCl as reference electrode, and platinum foil as the counter electrode. A constant potential of −0.2 V vs. Ag/AgCl was applied. The theoretical charges of 3.536 C, 7.072 C, and 70.72 C were maintained to achieve copper films having thicknesses of 500 nm, 1 µm, 10 µm, respectively. The Faradaic efficiency was 92%; therefore, the total charges were 3.84 C, 8.39 C, and 76.87 C for copper films of 500 nm, 1 µm, and 10 µm, respectively.

Depositing Graphene Film on Catalyst-Coated Support.

A graphene synthesis gas (GG) with the constituents shown in Table 1 was used to evaluate the effect of temperature on the electrodeposited copper film on the titanium foil. The copper films deposited on the titanium foil were exposed to different temperature in the presence of $H_2$ gas at a flow rate of 100 standard $cm^3$/min (for 6 minutes) and 100 standard $cm^3$/min of GG (for 6 minutes) at a pressure of 40 mTorr.

TABLE 1

| Gas Composition | Volume Percentage |
| --- | --- |
| Propane Propylene | 4.958% |
| Carbon Dioxide | 13.441% |
| Ethylene | 2.699% |
| Ethane | 8.805% |
| Methane | 55.823% |
| Carbon Monoxide | 14.274% |
| Total | 100.000% |

For copper at 500 nm and 1 micron thickness on the titanium support, a synthesis temperature of lower than 800° C. at 40 mTorr was successful in depositing a graphene film.

Example 2

Four titanium foil supports were coated with copper films having a thickness of 10 µm according to the method in Example 1. Graphene films were deposited on the copper coated titanium supports using the graphene synthesis gas of Table 1. 100 standard $cm^3$/min of hydrogen (for 6 minutes)

and 100 standard cm³/min of hydrocarbon gas (for 6 minutes) were used during the synthesis. The pressure during the CVD for all of the supports was 40 mTorr. Various synthesis temperatures were used and included 800° C., 900° C., 1000° C., and 1050° C.

For a comparative support, previous experiments were conducted on a copper foil having a thickness of 25 µm. The experiments showed that a synthesis temperature of at least 1050° C. was required for deposition of a graphene film.

For the copper coated titanium supports, no graphene films were detected by Raman spectroscopy at a temperature of 800° C. However, at a temperature of 900° C., a graphene film was obtained as confirmed by Raman spectroscopy. This demonstrates that, by reducing the thickness of the copper film in the support compared to a standalone copper foil, graphene can be obtained and successfully transferred at a lower temperature.

While specific embodiments have been described in considerable detail to illustrate the present invention, the description is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A method of producing a graphene film comprising:
   forming a catalyst film on a conductive support;
   forming the graphene film on the catalyst film; and
   electrolytically removing the catalyst film from the support.

2. The method of claim 1 wherein the catalyst film is electrolytically formed on the support.

3. The method of claim 1 wherein the catalyst film includes copper.

4. The method of claim 1 wherein the catalyst film has a thickness in a range of 1 nm to 25 µm.

5. The method of claim 4 wherein the thickness is in a range of 1 µm to 10 µm.

6. The method of claim 1 wherein forming the catalyst film is conducted in an electrolytic cell having an anode and an electrolyte, wherein the support acts as a cathode.

7. The method of claim 6 wherein the support travels through the electrolytic cell as the catalyst film is formed on the support.

8. The method of claim 1 wherein the graphene film is formed on the catalyst film by chemical vapor deposition.

9. The method of claim 1 wherein electrolytically removing the catalyst film includes transporting the support including the catalyst film and the graphene film through an electrolytic bath.

10. The method of claim 1 further comprising:
    transferring the graphene film to a substrate.

* * * * *